United States Patent [19]
Pearl, deceased et al.

[11] 3,993,866
[45] *Nov. 23, 1976

[54] CAMERA CAPSULE

[76] Inventors: David L. Pearl, deceased, late of Atlanta, Ga., by Peggy P. Pearl, heir, 4027 N. Strafford, NE., Atlanta, Ga. 31705; David M. Blackshear, 436 Safari Circle, Stone Mountain, Ga. 30083

[ * ] Notice: The portion of the term of this patent subsequent to June 25, 1991, has been disclaimed.

[22] Filed: June 20, 1974

[21] Appl. No.: 481,318

Related U.S. Application Data

[63] Continuation of Ser. No. 244,469, April 17, 1972, abandoned.

[52] U.S. Cl. .................... 178/7.81; 178/DIG. 38; 354/81
[51] Int. Cl.² ..................... H04N 5/26; H04N 7/18
[58] Field of Search .................... 178/7.81, DIG. 38; 354/81

[56] References Cited
UNITED STATES PATENTS

| | | | |
|---|---|---|---|
| 2,177,717 | 10/1939 | Hoeveler | 240/78 LJ |
| 2,274,444 | 2/1942 | Freed | 240/78 LG |
| 2,464,067 | 3/1949 | Barker | 95/11 |
| 3,031,351 | 4/1962 | McIlvaine | 350/276 R |
| 3,258,595 | 6/1966 | Galante | 178/DIG. 38 |
| 3,535,442 | 10/1970 | Jennings | 178/7.81 |
| 3,638,502 | 2/1972 | Leavitt | 95/12.5 |
| 3,739,703 | 6/1973 | Behles | 354/81 |
| D203,678 | 2/1966 | Newton | D61/1 C |

*Primary Examiner*—Howard W. Britton
*Attorney, Agent, or Firm*—Jones, Thomas & Askew

[57] ABSTRACT

A television or film camera is attached to an overhead ceiling structure, etc., on a support member which is capable of rotating or panning the camera about a vertical axis and tilting the camera about a horizontal axis. The camera and its movable support structure are enclosed in a stationary housing having a base portion adjacent the ceiling structure and a transparent dome suspended below the base portion. The dome is coated on its inside concave surface with a fine layer of chromium which renders the dome transparent from its relatively dark inside area and opaque or reflective from the lighter area outside the housing. The camera is thus able to assume an infinite number of positions and focus on various objects in its vicinity about the housing without visual detection from without the housing.

17 Claims, 6 Drawing Figures

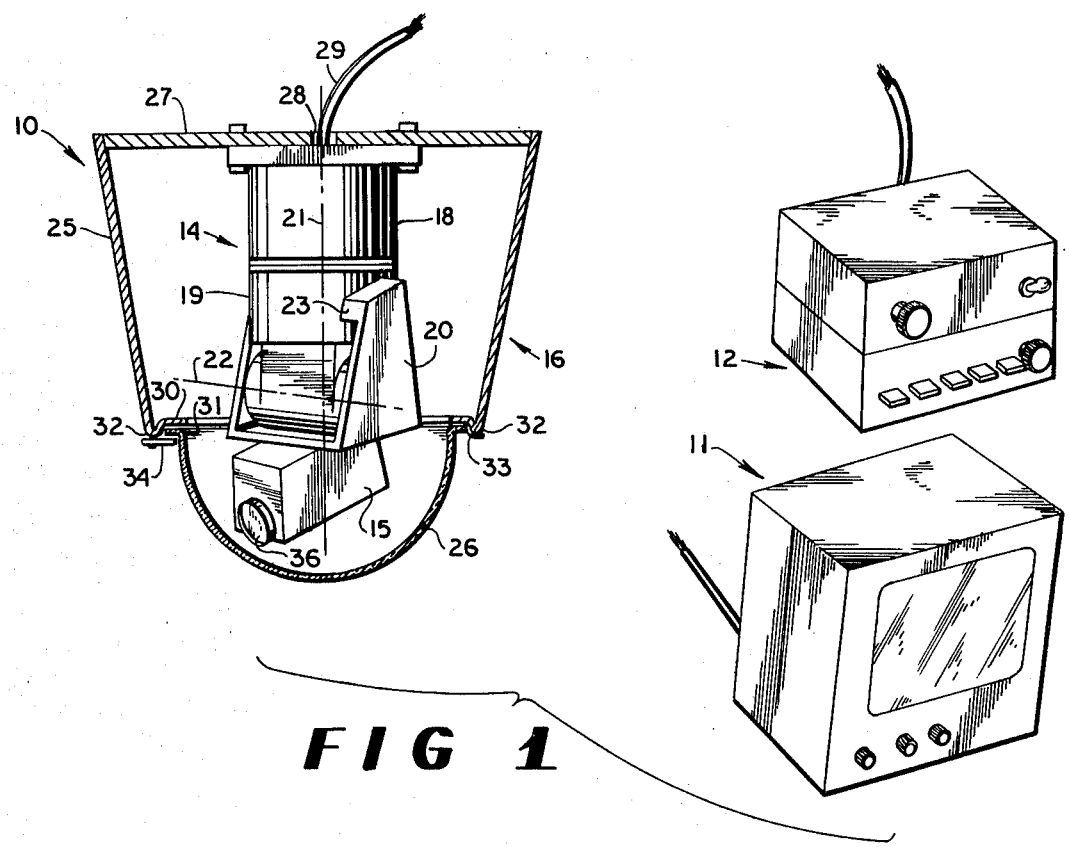
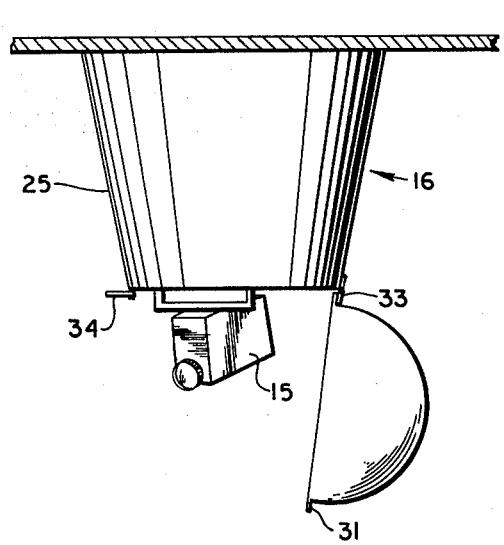
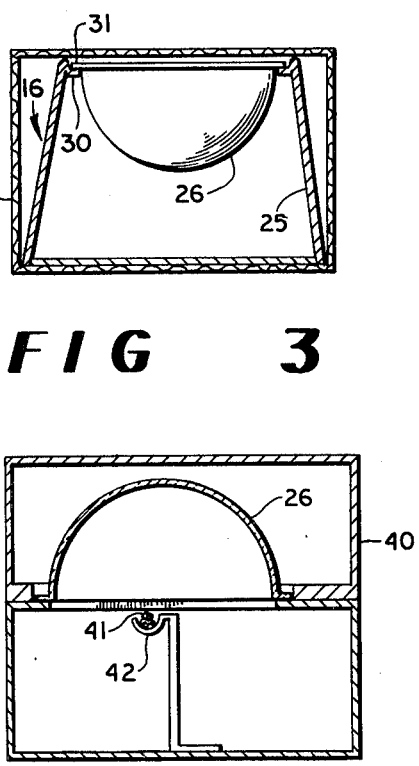
FIG 1
FIG 2
FIG 3
FIG 4

CAMERA CAPSULE

This is a continuation of application Ser. No. 244,469, filed Apr. 17, 1972, now abandoned.

BACKGROUND OF THE INVENTION

Television and film cameras have been used in the past for the purpose of surveillance. While many cameras are installed in a fixed or stationary position to continuously view one area, various camera control devices have been developed for panning and tilting camera so a camera can be moved about and aimed toward objects in different directions from the camera's field of view. In many situations it is desirable for a camera to rotate or pan about a vertical axis through arcs up to 360°, and possibly tilt about a horizontal axis as much as 90° so that an entire area about the camera can be monitored. Cameras used in these situations are usually for the purpose of monitoring areas where unauthorized activities are likely to occur, such as vandalism or theft in commercial stores, or such as inactivity or theft in manufacturing plants, warehouses, etc. A person likely to be engaged in some illegal or unauthorized activity is also likely to detect the presence of a camera or other monitoring device and move out of the view of the camera before engaging in such activity. When the camera is visible to such a person, the person can move behind the camera or wait for a moving camera to turn away.

In the past some attempt has been made to camouflage cameras which are used for the purpose of monitoring unauthorized or illegal activities. These devices usually comprise a housing placed about a camera with one or several openings in the housing. A camera is mounted in a stationary fashion inside the housing and views through only the one opening. The remaining openings are usually dummy openings. In order to alter the area viewed by the camera, the camera must be reoriented so as to place its lens adjacent another one of the several openings in the housing, or the camera and its housing must be moved in unison. The purpose of multiple lens camera housing was to confuse the onlooker as to which opening the live camera was seeing through. However, the restriction of camera movement as well as the infiltration of dust inside the housing through the housing openings usually were such that the housings were not practical. Also, the design of the housing was unattractive to the onlooker and psychologically undesirable due to the intimidating stare of the camera lens or the openings in the housing. Hence, such housings generally appeared as deterrent devices only and consequently won poor public acceptance. As a result, many of the surveillance cameras are mounted without a camouflage housing under the theory that the exposed movable camera would function as a psychological deterrent to pilferage, theft, inactivity, etc., in spite of the obvious shortcomings of the exposed camera.

SUMMARY OF THE INVENTION

Briefly described, the present invention comprises a camera capsule placed about a television camera wherein the camera can view through the capsule while effectively preventing an onlooker from seeing the camera or detecting the direction in which the camera is aimed. The camera capsule and camera are usually attached to an overhead support such as the ceiling structure in a building, and the camera support means can be arranged to support the camera in a stationary or fixed position, rotate the camera about a vertical axis, tilt the camera about a horizontal axis, or a combination thereof. The movable camera support means can be arranged so as to autoscan through an arc up to 360° with a self-reversing feature and to tilt through an arc of as much as 90°. Also, remote controls can be manually manipulated so that the direction of camera aim can be remotely controlled and a television monitor can display certain specific areas as may be desired. A remotely controlled zoom lens, focus adjustment and iris adjustment features for zooming, focusing, and adjusting the lens opening of the camera can be combined with the camera's function for greater flexibility in the coverage of the area being monitored.

The camera capsule includes a hollow frustum or frusto conical opaque base portion which generally surrounds the camera support, and a dome or hemispherical cover which has its circular edge portion positioned adjacent the smaller end of the base portion of the housing and which generally surrounds the camera and its lens. The dome has applied to its concave inner surface a coating of chromium which renders the dome transparent from its darker inside area and substantially opaque or reflective from the lighter outside area. The camera therefore can view through the transparent dome from inside the housing while a person located outside the housing would not be able to detect the presence of the camera or the position of the camera under normal lighting conditions.

Thus, it is an object of the present invention to provide a camera capsule which surrounds a television camera or the like and which allows the camera to assume an infinite number of positions within the housing while continuously viewing through the housing without being observed by a person outside the housing.

Another object of this invention is to provide a camera housing for use with television cameras or the like which provides virtually complete freedom of movement and observance by the camera inside the housing without disclosing the presence or position of the camera from outside the housing.

Another object of the present invention is to provide a camera housing which is inexpensive to manufacture and install, convenient to package and ship, and which is pleasing in appearance.

Other objects, features and advantages of the present invention will become apparent upon reading the following specification, when taken in conjunction with the accompanying drawing.

BRIEF DESCRIPTION OF THE DRAWING

FIG. 1 is a schematic illustration of the camera capsule, camera, camera support, monitor, and control console.

FIG. 2 is a side elevational view of the camera capsule showing the dome opened away from the base and with the camera exposed to view.

FIG. 3 is a side cross sectional view of the camera capsule arranged in its storage configuration and contained in a box for shipment.

FIG. 4 is a schematic illustration of the method of applying the light reflective coating to the concave inside surface of the dome of the camera housing.

DESCRIPTION OF A PREFERRED EMBODIMENT

Figure 5:
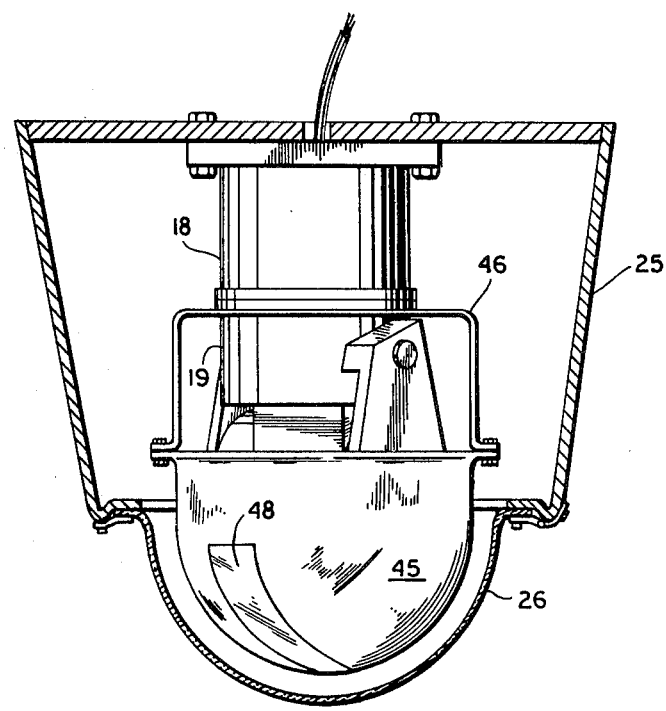
FIG. 5 is a cross sectional illustration of the camera capsule and showing the optional rotational inner dome.

Referring now in more detail to the drawing, in which like numerals indicate like parts throughout the several views, FIG. 1 illustrates camera assembly 10, monitor 11, and control console 12. Camera assembly 10 comprises support means 14, camera 15, and camera capsule or housing 16. Support means 14 comprises a stationary base 18, rotatable base 19, and tiltable camera platform 20. Support means 14 is usually oriented so that its center line or axis 21 is oriented vertically, and rotatable base 19 rotates about axis 21 under the influence of a drive motor (not shown) located internally of stationary base 18. Tiltable camera platform 20 is connected to rotatable base 19 and is tiltable about axis 22 which is normal to the axis of rotation 21 and which extends horizontally. Camera platform 20 includes counterweights 23 to offset the weight of camera 15, and a motor (not shown) located internally of rotatable base 19 functions to tilt camera platform 20 with respect to the rotatable base. Camera 15 is rigidly connected to camera platform 20 and moves in unison with the camera platform. Camera 15 can include various conventional camera features such as a zoom lens, iris opening adjustments, and focusing adjustments, all of which can be controlled from the remotely positioned control console 12.

Camera housing 16 includes frusto conical opaque base portion 25 and transparent dome or hemispherical cover 26. Base portion 25 includes support disc 27 which functions as support means for the camera housing, and for support means 14, and camera 15. Support disc 27 is usually mounted in an overhead position so that the axis of rotation 21 of the support means 14 is oriented vertically. Support disc 27 can be connected flat against a ceiling structure or suspended from various ceiling support beams, etc., or inserted up into a lowered suspended ceiling structure. The support disc can be connected to the ceiling structure by means of screws, nails, suspending wires or any conventional connecting devices. Normally the support disc 27 is sandwiched between stationary base 18 and the ceiling structure itself. An aperture 28 is formed in support disc 27 to provide access through the disc for wires 29, etc., for electrically connecting the camera assembly 10 to monitor 11 and control console 12. The hollow frusto conical base portion 25 has its larger circular end connected to the periphery of support disc 27. The smaller end of base portion 25 usually extends in a downward direction and terminates in rim 32 and recessed inwardly projecting circular flange 30. The length of base portion 25 is approximately equal to the length of support means 14 so that when the stationary base 18 of support means 14 is rigidly connected to support disc 27, the flattened camera supporting surface of tiltable camera platform 20 will be positioned at the flange 30 of the smaller base portion 25, and camera 15 will project below base portion 25.

Transparent dome 26 is approximately hemispherically shaped and its curvature terminates in an outwardly projecting circular flange 31. The diameter of circular flange 31 is sufficient to overlap the inwardly projecting recessed circular flange 30 of base portion 25, inside circular rim 32. Hinge 33 has one of its leafs connected to flange 30 and the other of its leafs connected to flange 31 so that dome 26 is hingedly connected to base portion 25 in the manner illustrated in FIG. 2. One or more rotatable tabs 34 are connected to rim 32 and are rotatable into overlapping relationship with respect to flange 31 of dome 26 so as to hold the dome in its closed relationship with base portion 25 and confine camera 15 and its support means 14 entirely within camera housing 16.

The axis 22 about which camera 15 tilts is located close to the center point of the radius of dome 26, and camera 15 is connected to tiltable camera platform 20 in such a manner that the lens 36 of camera 15 will always be positioned adjacent dome 26, regardless of the degree of tilt the camera assumes about its axis 22 or the direction the camera assumes about its axis 21. Thus, any light reflection from the inside surface of dome 26 back to lens 36 will be minimized. In addition, a light shield, disc shaped or otherwise, (not shown) can be attached about lens 36 to further minimize light reflection from the inside surfaces of dome 26, if desired.

Monitor 11 and control console 12 are usually located at a remote position from camera assembly 10. Monitor 11 displays the picture transmitted thereto by camera 15, and control console controls the movement of the camera within its stationary housing 16 as well as the iris opening, focus and zoom features of the camera's lens. Control console functions to operate the motors for rotating and tilting the camera, either on a continuous autoscan basis, or through direct control from an operator.

As is illustrated in FIG. 2, camera housing 16 can be opened by pivoting tabs 34 away from flange 31 and the dome 26 will tend to drop away from base portion 25 on hinge 33. The camera 15 is thus exposed for any desirable maintenance, adjustment, etc. When the dome 26 is closed against base portion 25, the camera housing 16 is substantially sealed from dust or any airborne debris because of the overlapping relationship of flanges 30 and 31 and the projection of rim 32. Any dust that should penetrate housing 16 will normally accumulate near the bottom center portion of dome 26, and when the dome is opened to the position illustrated in FIG. 2, any accumulated dust can be gently wiped from the dome or blown out of the dome.

The inside concave surface of dome 26 is coated with a fine layer of chromium or other reflective material so as to create a one-way mirror effect. As is illustrated in FIG. 4, the dome is placed in an autoclave 40. A chromium pellet 41 is positioned in a tungsten wire bucket 42, and a vacuum is drawn to approximately $5 \times 10^{-5}$ millimeters in the autoclave. The pellet is then heated slowly to its melting point and the pellet disperses at approximately 2,400° F. Because of the vacuum in the autoclave, the dispersion of the vaporized chromium is substantially uniform within the autoclave. Dome 26 is oriented so that its concave inside surface faces in a downward direction, and the chromium 41 is located at approximately the center of the radius of the concave surface of the dome 26. This causes a substantially uniform dispersion of the chromium onto the concave surface of the dome 26. While various quantities of chromium 41 can be utilized, it is desirable to apply a coating of chromium of approximately five one millionth of an inch in thickness or its equivalent onto the concave surface of the dome 26. This thickness of the coating appears to be sufficient to allow the dome 26 to be transparent from its darkened inside area when attached to the base portion 25 of the camera housing, but the dome appearance from the lighter area outside the dome to an onlooker is generally reflective, somewhat like a convex mirror. The result is that the presence and attitude of the camera within the closed camera housing 16 usually is not detectable from outside the camera. The thickness of the coating of chromium or other reflective substance applied to the concave surface of the dome 26 should not be so thick so as to reduce the penetration of light through the dome beyond the ability of detection by camera 15. In the embodiment of the invention disclosed herein, the chromium coating is sufficient to reduce the light transmissin by approximately 50%, or in terms of lens iris aperture, by one full f-stop. Of course, darker or lighter domes 26 can be fabricated for various lighting conditions, as may be desirable.

As illustrated in FIG. 3, camera housing 16 can be packaged and shipped within a relatively small container 45 by inserting the dome 26 in an inverted attitude with respect to base portion 25 so that the convex portion of the dome projects into base portion 25. This reduces the profile of the camera housing 16 so that the camera housing can be packaged in a smaller container. In addition, the placement of the dome 26 inside the base portion 25 in this manner causes the base portion 25 to protect the dome during storage and shipment. The flanges 30 and 31 cause the dome 26 to be suspended inside base portion 25 so that the dome remains untouched during shipment except at its circular rim area at flange 31. Thus, the coating of chromium applied to the concave surface of the dome is not likely to become scratched or otherwise distorted or damaged.

When the camera assembly is to be used in an area where strong back lights are adjacent the capsule, the camera silhouette might be detected in spite of the coating applied to the dome. To avoid back light detection, the camera assembly can be equipped with an internal, opaque dome 45 positioned just inside the external dome as illustrated in FIG. 5. The internal dome is supported by a bracket 46 connected to rotatable base 49 so that the internal dome rotates or pans with the camera. The internal dome 45 is opaque except for a transparent window 48. Window 48 is aligned with the line of sight of the lens of the camera and pans in unison with the lens. The window 48 can be formed so as to extend through an elongated vertical arc and the camera can tilt to see through various portions of the window or the upper and lower portions of the window can be blocked by paint or tape or any other suitable means to render the unused portion of the window opaque after the camera's field of view has been determined. Normally, internal dome 45 will be utilized when the camera pans but not when the camera tilts.

Figure 6:
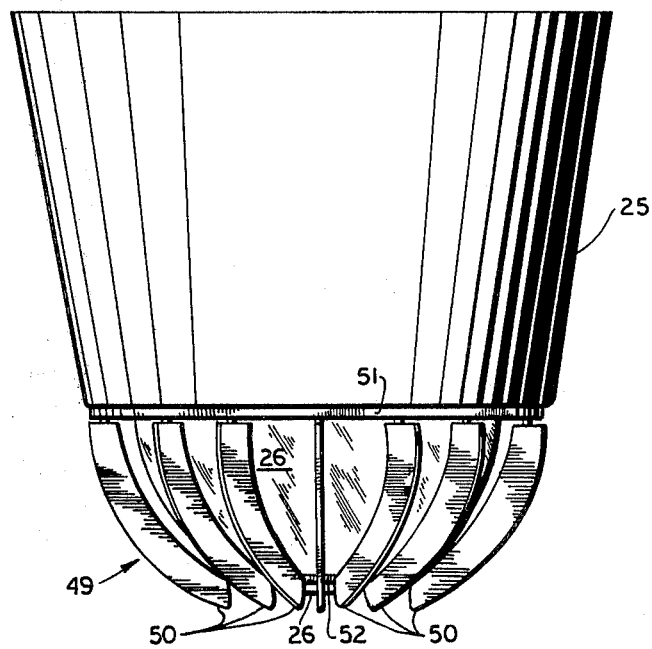
FIG. 6 is a side elevational view of the camera capsule with the optional external light shield.

As is illustrated in FIG. 6, an alternate solution is provided for back lighting problems, wherein an external vane assembly 49 is attached to the base portion 25 of the camera capsule. Vane assembly 49 includes a plurality of spaced-apart arcuate vanes 50 attached at their ends to upper and lower annular support rings 51 and 52. Upper support ring 51 is connected to base portion 25 and functions to support vanes 50 and lower support ring 52. Vanes 50 are substantially flat and are oriented so that their respective planes radiate from the center of dome 26. Since the camera lens is also always maintained in alignment with the center of the dome 26, the line of sight of the camera lens always will be maintained in alignment with the vane in front of the lens, allowing the lens to see between or around the vane. The remaining vanes function to form a light shield about the dome and prevent back lighting of the dome and exposure of the camera.

While this invention has been described in detail with particular reference to preferred embodiments thereof, it will be understood that variations and modifications can be effected within the spirit and scope of the invention as described herinbefore and as defined in the appended claims.

We claim:

1. In combination, a camera, support means connected to said camera, a housing enclosing said camera, said housing comprising a generally hemispherical transparent cover coated generally uniformly with chromium or the like of a density sufficient to reflect a portion of the light from outside said housing away from said housing whereby the cover is transparent from its darker side and generally reflective from its lighter side so that said camera is usually substantially invisible from outside said housing.

2. The combination of claim 1 and wherein the camera support means is constructed to rotate said camera about a vertical axis.

3. The combination of claim 1 and wherein the camera support means is constructed to rotate said camera about a vertical axis and to tilt said camera about a horizontal axis.

4. The combination of claim 1 and wherein the housing includes an opaque base portion surrounding at least a major portion of the camera support means.

5. The combination of claim 1 and wherein said generally hemispherical transparent cover is hingedly connected to said base portion, whereby when the cover is swung open, the camera and support means are physically exposed.

6. The combination of claim 1 and wherein the reflective coating is of sufficient density to attenuate the light transmitted through the transparent cover at least 50 percent.

7. The combination of claim 1 and wherein said camera is a television camera, and further including a television monitor capable of receiving a signal from said camera and arranged to display the image received by said camera.

8. A housing for concealing a camera or the like comprising hollow base defining a circular opening and a generally hemispherical transparent cover of a radius less than the height of said base, the circular edge portion of said cover including an outwardly extending flange member sized and shaped to engage said base at said circular opening either with said cover extending inwardly through said circular opening of the base for storage or extending outwardly from said circular opening of the base for confining a camera or the like in the enclosure defined by the base and cover.

9. The housing of claim 8 wherein the concave surface of said generally hemispherical transparent cover is coated with a light reflective substance wherein the cover is transparent from its darker side and generally reflective from its lighter side.

10. The housing of claim 8 and further including hinge means for pivotally connecting said cover to said base.

11. The housing of claim 8 and further including a camera, support means situated in the base of said housing and connected to said camera and arranged to rotate said camera about a first axis parallel to the longitudinal axis of said base and to pivot said camera about an axis approximately normal to said first axis and approximately at the center of curvature of said hemispherical transparent cover, said support means being constructed and arranged to maintain the lens of said camera oriented toward and adjacent said transparent cover, whereby said camera and its support means substantially eclipse any back light.

12. In combination, a camera, support means connected to said camera constructed and arranged to rotate said camera about a vertical axis and to tilt said camera about a horizontal axis, a stationary housing enclosing said camera comprising an opaque base portion surrounding at least a major portion of said support means and defining a downwardly facing opening, a generally hemispherical transparent cover removably connected to said base portion adjacent the downwardly facing opening whereby said camera is movable to an infinite number of positions with its lens facing said transparent cover, said transparent cover being coated generally uniformly with chromium or the like of a thickness sufficient to reflect a portion of the light from outside said housing away from said housing so that said camera is usually substantially invisible from outside said housing.

13. The combination of claim 12 and further including means for remotely controlling the camera support means for rotating the camera about a vertical axis within said housing.

14. The combination of claim 12 and further including remote control means connected to said support means for pivoting said camera about a horizontal axis.

15. The combination of claim 12 and wherein said camera is a television camera, and further including a television monitor capable of receiving the signal of said camera and arranged to display the image received by said camera.

16. A housing for concealing a television camera or the like comprising an opaque hollow frusto conical base for mounting on a supporting object, and a generally hemispherical transparent cover of a radius less than the height of said base, the circular edge portion of said cover being sized and shaped to engage the smaller end of said generally frusto conical base with the convex portion of said cover extending either inwardly of said base a distance less than the height of said base for storage purposes or the like or outwardly of said base for confining a television camera or the like in said housing, said cover being coated with chromium or the like of a generally uniform density to reflect a portion of the light from outside said housing away from said housing so that the camera inside said housing is normally invisible from outside said housing.

17. In combination, a camera, support means connected to said camera, a housing enclosing said camera, said housing comprising a base portion of hollow frusto-conical configuration with an annular edge portion about its smaller diameter opening, a generally hemispherical transparent cover with an annular edge normally positioned adjacent the smaller diameter opening of said base portion, said hemispherical cover being coated generally uniformly with chromium or the like of a density sufficient to reflect a portion of the light from outside said housing away from said housing whereby the cover is transparent from its darker side and is generally reflective from its lighter side so that said camera is usually substantially invisible from outside the housing.

* * * * *